United States Patent Office 3,679,387
Patented July 25, 1972

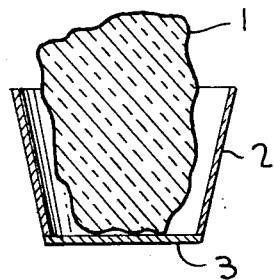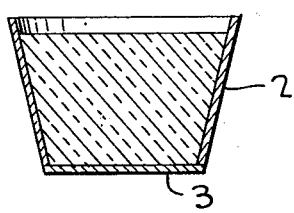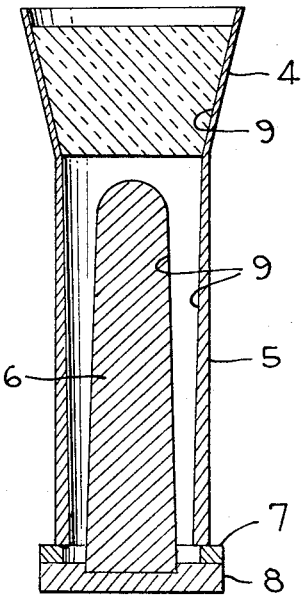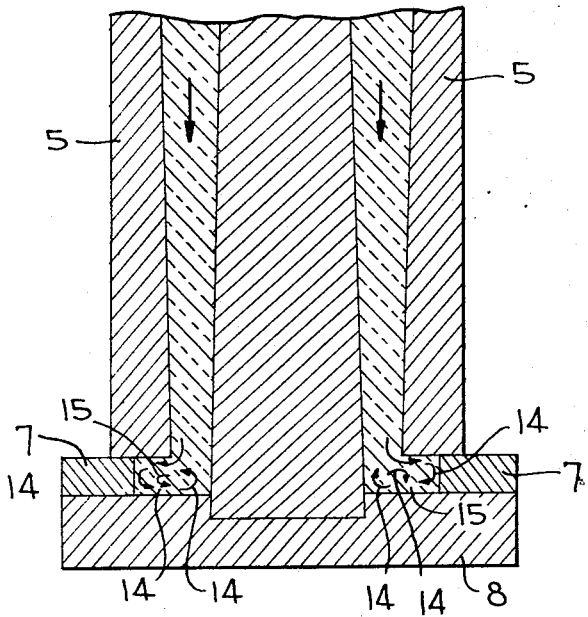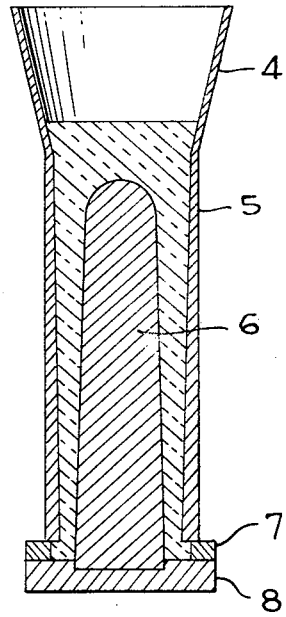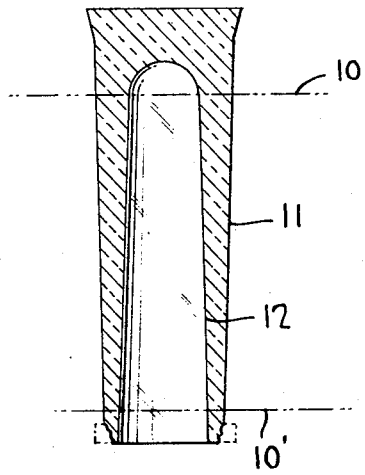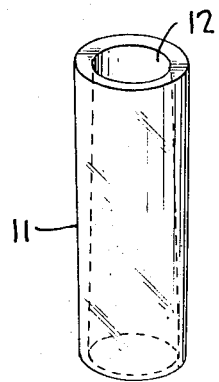

3,679,387
METHOD AND APPARATUS FOR MANUFACTURING TUBULAR OPTICAL GLASS
Tetsuo Kudo and Kozo Nakatani, Itami, and Kiyoyasu Koda, Nishinomiya, Japan, assignors to Minolta Camera Kabushiki Kaisha, Osaka, Japan
Continuation-in-part of application Ser. No. 830,623, June 5, 1969. This application Dec. 1, 1971, Ser. No. 203,789
Claims priority, application Japan, June 17, 1968, 43/41,338
Int. Cl. C03b 9/04
U.S. Cl. 65—105
5 Claims

ABSTRACT OF THE DISCLOSURE

An upstanding mold is divided into inner and outer sections which rest on a base including a ring member so as to form a reservoir at the bottom of the mold. The inner and outer molds have inclining surfaces so that the annular space between the molds increases from the base support to the top of the mold. A glass preform rests on top of the mold and is heated to cause the glass to melt and flow into the annular recess. The molten glass at the bottom of the mold collects in the reservoir thereby enabling the glass to flow freely down between the mold sections, thereby preventing bubbles and stria from forming. After the glass has cooled, the bottom is removed from the mold and the inner and outer molds withdrawn downwardly so as to free the glass cylinder.

BACKGROUND OF THE INVENTION

This application is a continuation-in-part of application Ser. No. 830,623, filed June 5, 1969, now abandoned.

Both hand and machine methods for molding tubular glass are well known in the prior art. However, hand drawing requires a particular technique and highly experienced workers and is therefore not easily reduced to mass production of tubular glass having identical and uniform optical characteristics. On the other hand, while machine drawing and molding techniques are suitable for mass production, they require large and expensive apparatus, and the glass produced by such mass production techniques has a large quantity of bubbles and stria. Therefore, both the hand and machine prior art glass drawing and molding methods are unsatisfactory for producing glass having optimum optical characteristics, namely, an absence of bubbles and stria.

SUMMARY OF THE INVENTION

The present invention overcomes the aforementioned drawbacks of the prior art techniques so as to produce, regardless of the quantity of production, tubular glass molds having excellent optical characteristics so that the glass may be used as a blank material for lenses, optical systems and the like.

In accordance with the present invention, the tubular glass mold is formed on a bottom support member in which a reservoir is formed at the bottom of the mold by a ring-like member which rests on the bottom support member. An inner mold upstands vertically from the bottom support member and an outer mold rests on top of the ring-like member. The inner mold has a gradual inward taper from the bottom of the mold to the top of the mold and the outer mold is also gradually tapered outwardly from the bottom to the top of the mold. The top of the mold is capable of supporting a truncated cone-shaped hopper containing a glass preform.

The glass preform is heated to a temperature higher than its softening temperature thereby enabling it to flow down slowly between the inner and outer molds. As the molten glass reaches the reservoir at the bottom of the mold it is collected thereby enabling glass to continue to freely flow down the side surfaces of the inner and outer mold, thereby considerably reducing or eliminating the formation of bubbles and stria.

It is a primary object of the invention to provide an improved method and apparatus for manufacturing optical tubular glass free of bubbles and stria.

The aforementioned objects and advantages will be more readily understood from the following description taken in conjunction with the accompanying drawings wherein:

FIG. 1 is a side section of a truncated cone-shaped mold which carries a glass mass;

FIG. 2 is another side section of the hopper illustrating the glass mass in a softened condition so as to form a glass preform;

FIG. 3 is a side sectional view of the mold assembly with the truncated cone-shaped hopper mounted at its top;

FIG. 4A is a sectional view of the mold assembly illustrating the formation of the tubular glass within the mold;

FIG. 4B is an enlarged side sectional view of the bottom portion of the mold assembly illustrating the flow of glass within the mold;

FIG. 5 illustrates the tubular glass removed from the mold assembly; and

FIG. 6 shows the completed tubular glass obtained by cutting the upper and bottom portions thereof as indicated in FIG. 5.

DETAILED DESCRIPTION OF THE METHOD AND APPARATUS

In accordance with the method of the present invention, the first step in the process for manufacturing high quality glass is to select a glass mass 1 which is relatively free of stria and bubbles from a glass melt and placing the glass mass in a mold 2 which is a truncated cone-shaped mold open at the top as illustrated in FIGS. 1–3. As is well known in the art, the inner surfaces of mold 2 may preferably be coated with a mold releasing agent such as Kaolin and water in ratio of 1:1. Glass mass 1 is heated in an electric furnace to a temperature higher by approximately 100° C. than the softening temperature of the glass and the glass mass is heated until it is completely softened and assumes a preform according to the shape of mold 2. The glass preform is then allowed to cool at room temperature, removed from the mold 2 and washed to remove the mold releasing agent.

The mold assembly for producing high quality tubular glass is illustrated in FIG. 3 in which ring 7 is mounted on bottom support member 8. At the center of bottom support cylinder 8 cylindrical inner mold 6 is placed and cylindrically shaped outer mold 5 is placed on ring 7 concentric with respect to inner mold 6. As illustrated in FIG. 3, inner mold 6 has a gradual taper so that its bottom portion is of greater diameter than its uppermost portion. Also, outer mold 5 is gradually tapered from the bottom of the mold to the top of the mold so that the uppermost portion is of greater diameter than the bottommost portion. Truncated cone-shaped hopper 4 rests on top of outer mold 5 as illustrated in FIG. 3. The inner surfaces of hopper 4, outer mold 5 and the outer surfaces of inner mold 6 are coated with the aforementioned releasing agent and water.

The previously mentioned glass preform is placed into hopper 4 and the entire mold assembly is placed in an electric furnace which is capable of heating the entire structure to approximately 200° C. higher than the softening temperature of the glass preform.

An important feature of the mold assembly of FIG. 3 is the structural relationship of bottom support member 8, ring 7 and bottom portion of outer mold 5, which form a reservoir 15 (as illustrated in FIG. 4B) on the upper surface of bottom support member 8. A temperature of 200° C. higher than the softening temperature of the glass preform is maintained for approximately one hour which enables the glass preform to melt and fully flow into the annular space between outer mold 5 and inner mold 6 as illustrated in FIG. 4A. The mold is then allowed to cool by decreasing the temperature of the mold assembly at the rate of approximately 3° C. per hour.

As the glass is heated and flows down in the space between outer mold 5 and inner mold 6, the glass enters reservoir 15 (as illustrated in FIG. 4B) and thereby enables the glass to flow freely between outer mold 5 and inner mold 6 so as to prevent formation of bubbles and stria therein.

After the glass mold assembly has been cooled as previously mentioned, it is removed from the furnace and the tubular glass mold is disassembled as follows. Bottom support member 8 and ring 7 are removed, the inner mold 6 is withdrawn downwardly from the mold structure, and the circular flange of glass formed within reservoir 15 is broken away, thereby enabling outer mold 5 to be withdrawn downwardly over the tubular glass. At this stage of the process, the tubular glass has the shape as illustrated in FIG. 6. The molded glass is then washed to remove the releasing agent and cut along lines 10, 10' and as illustrated in FIG. 5. The outer surface 11 and inner surface 12 of the tubular glass form are then polished to produce the cylindrical glass form illustrated in FIG. 6. The cylindrical blank is then ready to be processed as desired to produce cylindrical lenses, anamorphic lenses, etc.

It is understood that the preceding description was with respect to one mold assembly solely for the purposes of describing the method and apparatus. It will be apparent to those skilled in the art that method may be used in mass production by using a great number of mold assemblies. A tubular glass blank having a diameter of 10 centimeters and a height of 50 centimeters was made by the aforementioned method in an electric furnace of 80 centimeters in height, 70 centimeters in width, and 2 meters in depth. The glass produced by the method and apparatus of this invention is of high optical quality in that it is free of stria and bubbles.

What is claimed is:

1. A method for forming hollow cylinders of glass having optical characteristics comprising the steps of:
   (1) placing a glass preform free of stria and bubbles in a mold hopper on the top of a mold structure comprising an inner mold and an outer mold forming therebetween a cylindrical mold cavity,
   (2) heating said preform and said mold structure to a temperature greater than the softening temperature of said glass to cause said glass preform to freely flow into said cylindrical mold cavity,
   (3) collecting a portion of said freely flowing glass in a reservoir at the bottom of said mold cavity thereby preventing stria and bubbles from forming in said freely flowing glass, and
   (4) cooling the mold formed in step (3) to substantially room temperature.

2. A method as in claim 1 wherein said temperature of step 3 is approximately 200° C.

3. A method as in claim 2 wherein said cooling is performed at approximately steps of 3° C. per hour.

4. Apparatus for molding tubular glass comprising:
   a mold structure including a bottom mold, an inner mold and an outer mold, the outside surface of said inner mold having a substantially cylindrical shape and the inside surface of said outer mold having a substantially cylindrical shape on a lower portion opposing said inner mold and said outer mold is positioned concentrically with the outside surface of said inner mold, the inner surface of said outer mold having walls with an outwardly directed taper and the surface of said inner mold having an inwardly directed taper, said tapers are defined as extending from the bottom of said mold to the top portion thereof, and
   a ring positioned between the bottom of said outer mold and said bottom mold to form a reservoir for collecting glass within said mold structure.

5. A method as in claim 1 further comprising the steps of
   (5) removing said reservoir and the glass formed therein from said mold cavity,
   (6) separating said molded glass from said mold cavity, and
   (7) cutting the upper and lower ends of said molded glass to form a hollow cylinder of desired length.

References Cited

UNITED STATES PATENTS

| | | | |
|---|---|---|---|
| 708,326 | 9/1902 | Ebeling | 65—361 X |
| 975,409 | 11/1910 | Fry | 65—357 |
| 2,610,444 | 9/1952 | Kurz | 65—63 |
| 3,155,748 | 11/1964 | Couri | 65—285 X |

ARTHUR D. KELLOGG, Primary Examiner

U.S. Cl. X.R.

65—64, 70, 285, 358